United States Patent

[11] 3,619,491

[72] Inventor Mitsuo Fujita
Tokyo, Japan

[21] Appl. No. 862,708
[22] Filed Oct. 1, 1969
[45] Patented Nov. 9, 1971
[73] Assignee Victor Company of Japan, Limited
Kanagawa-ku, Yokohama, Japan
[32] Priority Oct. 3, 1968
[33] Japan
[31] 43/71731

[54] SYSTEM FOR CORRECTING THE PHASE OF A CARRIER CHROMA SIGNAL
6 Claims, 3 Drawing Figs.

[52] U.S. Cl. ........................................ 178/5.4 CD, 178/6.6 TC, 328/15, 307/271
[51] Int. Cl. ........................................ H04n 5/76, H04n 9/46, H04n 5/21
[50] Field of Search ........................................ 178/6.6 TC, 5.4 CD, 5.4 SY, 69.5 CB

[56] References Cited

UNITED STATES PATENTS

| | | | |
|---|---|---|---|
| 3,100,816 | 8/1963 | Coleman, Jr. et al. ........ | 178/514 C |
| 3,141,926 | 7/1964 | Newell ........ | 178/5.4 C |
| 3,213,192 | 10/1965 | Jensen ........ | 178/5.4 C |
| 3,507,983 | 4/1970 | Leman ........ | 178/5.4 C |

*Primary Examiner*—Robert L. Griffin
*Assistant Examiner*—John C. Martin
*Attorney*—Louis Bernat

ABSTRACT: The invention provides a system for correcting the phase of a carrier chroma signal having a timing axis variation contained in a color video signal reproduced by a magnetic recording and reproducing apparatus. The correction removes the timing axis variation. The system comprises frequency converter means for frequency converting the carrier chroma signal twice, means for sampling a burst signal from the output of said second frequency converter means, a phase comparator for comparing the phase of the burst signal with the phase of the output of a reference subcarrier oscillator, and voltage control oscillator means adapted to be controlled by the output of said phase comparator to oscillate and produce an output which is fed back to said frequency converter means.

Fig. 1
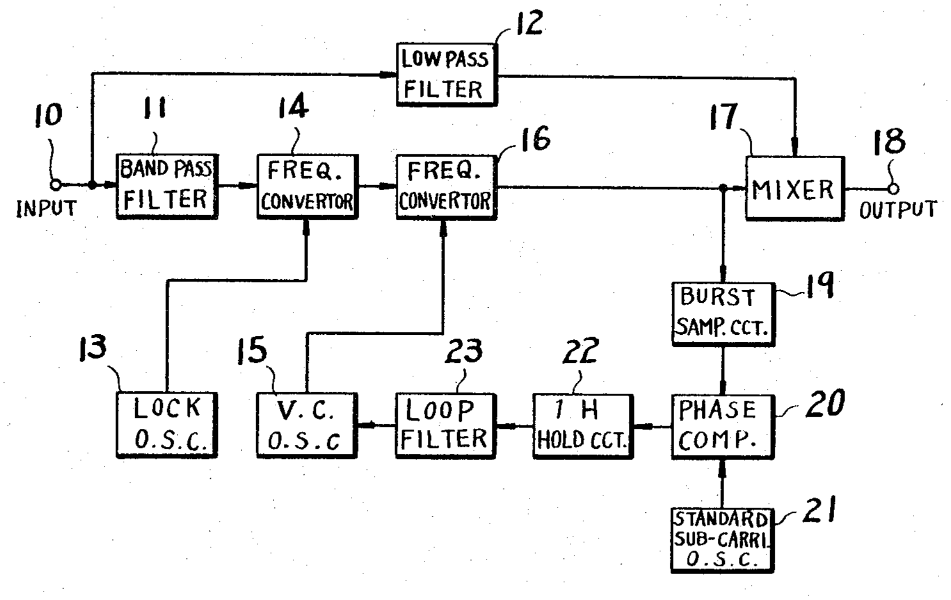
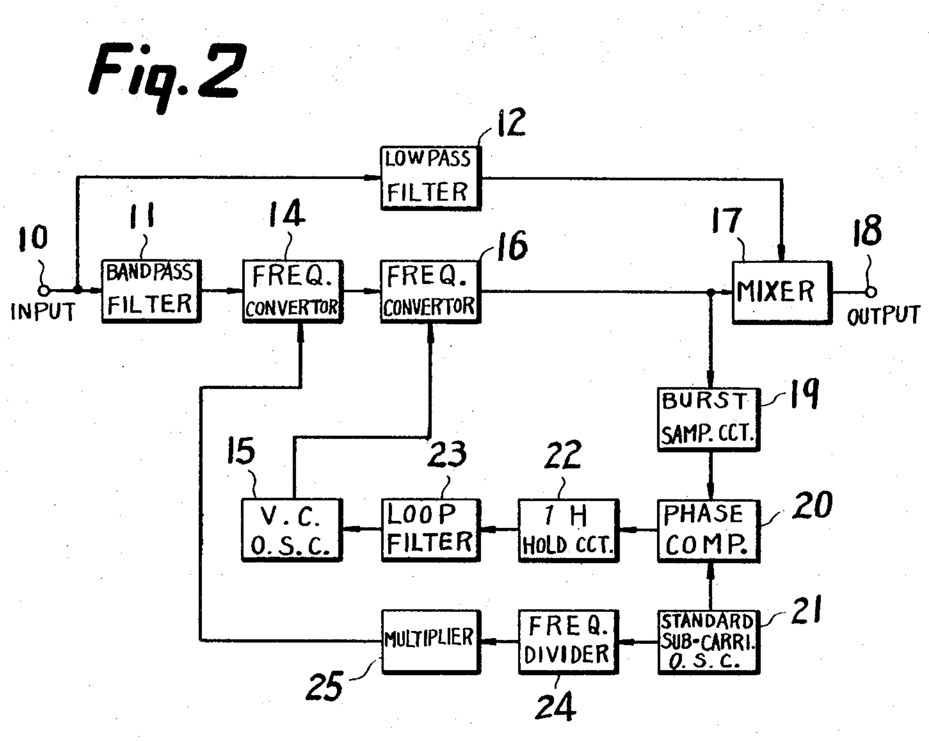
INVENTOR
MITSUO FUJITA
BY [signature]
ATTORNEY

INVENTOR
MITSUO FUJITA

BY [signature]
ATTORNEY

SYSTEM FOR CORRECTING THE PHASE OF A CARRIER CHROMA SIGNAL

This invention relates to systems for correcting the phase of a carrier chroma signal. More particularly, the invention relates to a system for correcting the phase of a carrier chroma signal having a timing axis variation of a color video signal reproduced by a magnetic recording and reproducing apparatus (hereinafter referred to as a VTR).

In general, reproduced carrier chroma signals often have a timing axis variation when color video signals of the NTSC system are recorded and reproduced by a color VTR. Systems hitherto used for correcting this timing axis variation include the following: (1) A decode-encode system, (2) a double heterodyne system, (3) an electronic resolver system and (4) a variable delay line control system. These systems have disadvantages. The process involved in effecting a correction of a timing axis variation, by all the systems referred to above, is complicated. The construction of these systems requires a multiplicity of parts, thus making it impossible to reduce cost. The present invention obviates the aforementioned disadvantages of the conventional systems.

Accordingly, a principal object of this invention is to provide a system incorporated in a color VTR which enables a correction of the phase of a reproduced carrier chroma signal and effectively removing a timing axis variation from said signal by a very simple construction.

Another object of the invention is to provide a system for correcting the phase of a carrier chroma signal which uses a color processing circuit which is simple in construction and low in cost, so that the system requires very little adjustment and is high in stability of performance.

A further object of the invention is to provide a system for correcting the phase of a carrier chroma signal which has particular utility in VTR's of the type having no capstan servomotor, which system is very likely to have a timing axis variation of high order.

Additional objects as well as features and advantages of the invention will become evident from a consideration of the description set forth hereinafter when considered in conjunction with the accompanying drawings, in which:

FIG. 1 is a block diagram showing the principles of the system according to this invention;

FIG. 2 is a block diagram of one embodiment of the system according to this invention.

Figure 3:
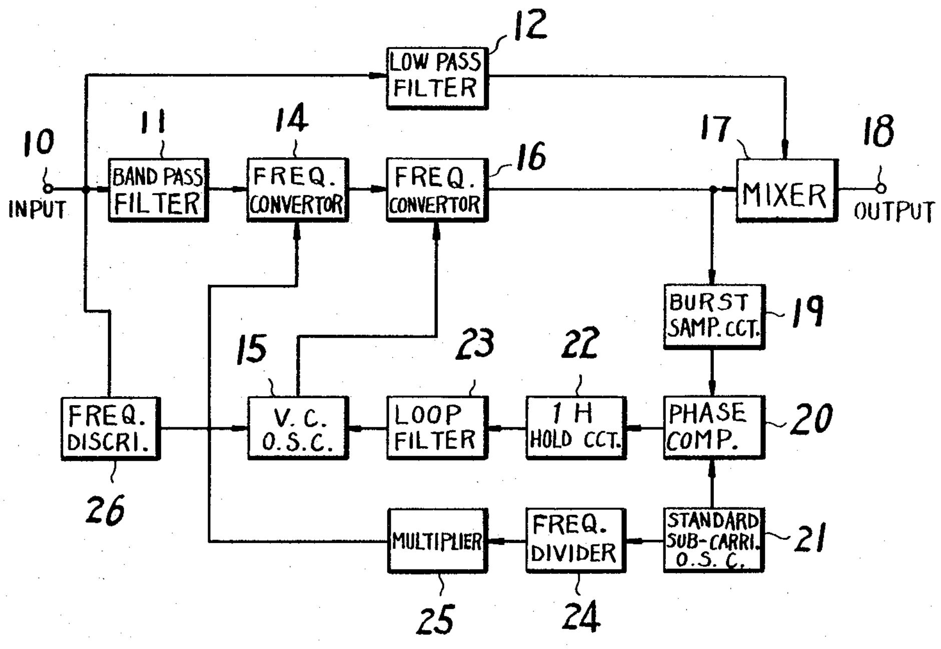
FIG. 3 is a block diagram of the other embodiment of the system according to this invention.

The principles of the system, according to this invention, will now be explained with reference to FIG. 1. In FIG. 1, a color video signal, of the NTSC system reproduced by a color VTR, is introduced into the system through an input terminal 10 from there, the signal is supplied to a band-pass filter 11 where a carrier chroma signal is separated from the color video signal. The signal is also applied to a low-pass filter 12 where a brightness signal is separated from the color video signal. The carrier chroma signal from the band-pass filter 11 is frequency converted by the output of a lock oscillator 13, at a frequency converter 14.

The oscillation frequency $f_1$, of the lock oscillator 13, is selected such that it is higher than the frequency $f_0$ of chrominance subcarrier and is not an even multiple thereof. The carrier chroma signal frequency is converted once at the frequency converter 14 and thereafter is frequency converted again by the output frequency of a voltage control oscillator 15, at a frequency converter 16. The center frequency of oscillation of the voltage control oscillator 15 is selected such that it is sufficiently near to the frequency $F_1$ referred to above. Accordingly, the output of the frequency converter 16 has a frequency which is near the frequency of the input chrominance subcarrier. Mixer 17 mixes the carrier chroma signal appearing on the output of the frequency converter 16 with the brightness signal appearing on the output of the low-pass filter 12. The output of mixer 17 is taken out through an output terminal 18.

The output of the frequency converter 16 is supplied to a burst sampling circuit 19 where a burst signal is sampled from the output. The burst signal, thus sampled, is supplied to a phase comparator 20 where the phase of said burst signal is compared with the phase of the output of a standard subcarrier oscillator 21. A voltage representing a phase difference is detected by the phase comparator 20. This voltage is produced during the burst period alone. The voltage representing the detected phase difference is held, after being produced, during one horizontal scanning period (1H), by a one horizontal scanning period holding circuit 22.

The differential voltage held by the holding circuit 22 is passed through a loop filter 23 and supplied to control the voltage control oscillator 15, as a control voltage.

It will be evident that the closed feedback loop is made up of the voltage control oscillator 15, frequency converter 16, burst sampling circuit 19, phase comparator 20, horizontal scanning period holding circuit 22, and loop filter 23. The voltage control oscillator 15 functions such that the output of the frequency converter 16 is made to agree, in phase and frequency, with the output of the standard subcarrier oscillator 21. Accordingly, a color video signal, which includes a carrier chroma signal having no timing axis variation, appears at the output terminal.

FIG. 2 shows, in a block diagram, an embodiment of the system according to this invention. Parts similar to those of FIG. 1 are designated by like reference characters and the explanation thereof is omitted.

An input color video signal is introduced into the system through an input terminal 10 and is supplied to a band-pass filter 11, with a band of 3 to 4 MHz. A carrier chroma signal is separated by filtering from the color video signal at said band-pass filter 11. The chroma signal is frequency converted at a frequency converter 14 by a frequency of 5.4 MHz., which is about 3/2 as high as the frequency of 3.58 MHz. (more precisely, 3.579545 MHz.) of a standard subcarrier from a multiplier 25 subsequently to be described. The frequency of the carrier chroma signal is converted to a range from 8.4 to 9.4 MHz.

The output signal of the frequency converter 14 is frequency converted again at a frequency converter 16 responsive to the output signal of a voltage control oscillator 15 having a center frequency of 5.4 MHz., which forms a part of the feedback loop. The frequency of the carrier chroma signal is returned to a range from 3 to 4 MHz. Mixer 17 mixes the carrier chroma signal, of the range from 3 to 4 MHz., with the output signal of a low-pass filter 12 with a band of 0 to 3 MHz. Thus, a color video signal, including a carrier chroma signal which has its timing axis variation removed, is provided through an output terminal 18.

On the other hand, a control voltage is formed form the output of the frequency converter 16, applied through a burst sampling circuit 19, phase comparator 20, one horizontal period holding circuit 22, and loop filter 23. This voltage controls the voltage control oscillator 15, whereby a feedback loop is formed as is the case with the system of FIG. 1.

In the second embodiment of FIG. 2, the lock oscillator 13, shown in FIG. 1, is not used. However, the output of a standard subcarrier oscillator 21 is frequency divided by means of a ½-frequency divider 24. This produces an output whose frequency is one-half the original frequency. The frequency of the output is multiplied three times at a three-time multiplier 25, to provide an output of the frequency of 5.4 MHz. which is supplied to the frequency converter 14. The embodiment of the system described above has a particular utility when used with a color VTR having a capstan servomotor which has relatively little timing axis variation.

Another embodiment of the system according to this invention is shown in a block diagram in FIG. 3. Parts similar to those shown in FIGS. 1 and 2 are designated by like reference characters and the description thereof is omitted.

A color video signal is introduced into the system through an input terminal 10 and supplied to a horizontal synchronizing signal (or burst signal) frequency discriminator 26. simultaneously, it is also supplied to a Band-pass filter 11 and low-pass filter 12. The frequency discriminator 26 produces an output signal which is proportional to the variation in the frequency of the input carrier chroma signal. This output signal is used to control the center frequency of oscillation of a voltage control oscillator 15. This embodiment of the system operates in the same manner as the embodiment previously described with reference to FIG. 2.

This embodiment of the system according to this invention has particular utility with the output Of VTR having a timing axis variation which is several times greater than that of the output of VTR used with the embodiment shown in FIG. 2. The embodiment of FIG. 3 can effect phase correction such that it can be put to practical use. The embodiment is particularly useful with the output of a VTR which has a timing axis variation of high order because the VTR is not provided with a servomotor.

While preferred embodiments of the invention have been shown and described, it is to be understood that the invention is not limited thereto and that many changes and variations may be made therein without departing from the spirit and scope of the invention.

What is claimed is:

1. A system for correcting the phase of a carrier chroma signal comprising first frequency converter means for frequency converting the carrier chroma signal of a color video signal which has a timing axis variation, second frequency converter means for frequency converting the output signal of said first frequency converter means, standard subcarrier oscillator means, means for sampling a burst signal from the output signal of said second frequency converter means, means for comparing the phase of the sampled burst signal with the phase of the output of said standard subcarrier oscillator means and for producing a differential voltage corresponding to the phase difference between the sampled burst signal and the output of said standard subcarrier oscillator means, voltage control oscillator means which is controlled in its oscillating frequency in response to the differential voltage of said phase comparator means, means for applying the output of said voltage controlled oscillator to said first or second frequency converter means, and means for producing a signal having a predetermined frequency to be supplied to the other frequency converter means, said predetermined frequency being selected such that the output signal of said second frequency converter means has a burst signal equal in phase and frequency to the standard subcarrier whereby the timing axis variation of the carrier chroma signal can be removed.

2. A system for correcting the phase of a carrier chroma signal as defined in claim 1 in which the predetermined frequency by which said carrier chroma signal is frequency converted at the other frequency converter means is selected such that it is higher than the subcarrier frequency of said carrier chroma signal and is not equal to a multiple of the subcarrier frequency.

3. A system for correcting the phase of a carrier chroma signal as defined in claim 1 further comprising a holding circuit means for holding the differential voltage output of said phase comparator means for one horizontal scanning period.

4. A system for correcting the phase of a carrier chroma signal as defined in claim 1 in which said first frequency converter means receives the signal having a predetermined frequency and said second frequency converter means receives the output of said voltage control oscillator means.

5. A system for correcting the phase of a carrier chroma signal as defined in claim 1 further comprising frequency discriminator means for receiving said carrier chroma signal having a timing axis variation and producing an output which controls the center frequency of oscillation of said voltage controlled oscillator means, said output of said frequency discriminator means being proportional to the variation in the frequency of the input carrier chroma signal.

6. A system for correcting the phase of a carrier chroma signal as defined in claim 4 in which said means for producing a signal having a predetermined frequency comprises means for frequency dividing and multiplying the output of said standard subcarrier oscillator means.

* * * * *